United States Patent Office 3,472,889
Patented Oct. 14, 1969

3,472,889
AMINONITRILES
Milton B. Frankel, Tarzana, Calif., assignor to Aerojet-General Corporation, El Monte, Calif., a corporation of Ohio
No Drawing. Continuation of application Ser. No. 251,030, Jan. 14, 1963. This application Apr. 18, 1967, Ser. No. 631,615
Int. Cl. C07c *121/00, 121/42, 128/78*
U.S. Cl. 260—465.5         9 Claims

ABSTRACT OF THE DISCLOSURE

Compounds useful as high energy plasticizers having the general formula:

wherein A is an alkylene radical, R is a member selected from the group consisting of alkyl, nitroalkyl radicals containing from 1 to 3 nitro groups and mononitrazaalkyl, and $R_1$ is a nitroalkyl radical containing from 1 to 3 nitro groups, said radicals A, R, and $R_1$ containing from 1 to about 6 carbon atoms.

---

The present application is a continuation of our copending application, Ser. No. 251,030, filed Jan. 14, 1963 for "Compounds and Method," and now abandoned.

This invention relates to new compounds and a method for their preparation. In particular, it relates to aminonitriles having the general formula:

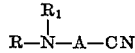

wherein R may be alkyl, nitroalkyl or nitrazaalkyl, $R_1$ may be nitro or nitroalkyl, A is an alkylene radical, and wherein R is either nitroalkyl or nitrazaalkyl when $R_1$ is nitro.

The compounds of this invention may be used as plasticizers for nitro cellulose and nitro containing polymers such as polyurethane. Conventional plasticizers frequently detract from the explosive power of the nitro polymers in which they are incorporated. The compounds of this invention, however, do not have this drawback since they are not only plasticizers but also exhibit high explosive energy in their own right. The nitro polymers can be polymerized in the presence of an aminonitrile of this invention or the aminonitrile can be mixed into the nitro polymer after polymerization.

Certain compounds of this invention are prepared by reacting a substituted aminonitrile with a nitroalkanol in accordance with the general reaction scheme set forth below:

I.  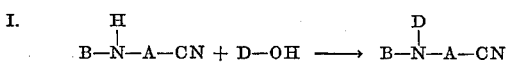

wherein B is alkyl, nitroalkyl or nitrazaalkyl, A is an alkylene radical and D is nitroalkyl.

As defined above, B is an alkyl radical, a nitroalkyl radical or a nitrazaalkyl radical. Preferably, the alkyl group in each of these radicals is a lower alkyl that is, containing up to about 6 carbon atoms. Typical radicals include methyl, propyl, butyl, isopropyl, isobutyl, 3,3-dinitrobutyl, 3,3,3-trinitropropyl, 2,3-dinitrobutyl, 3,3-dinitrohexyl, 3-nitrazabutyl, 3-nitrazahexyl and 4-nitrazahexyl.

A is an alkylene radical, preferably a lower alkylene radical containing from 1 to about 6 carbon atoms, such as methylene, ethylene, tetramethylene, and hexamethylene. D is nitroalkyl. Typical nitroalkyl radicals include trinitroethyl, 2,2-dinitropropyl, 2,2-dinitrobutyl, 2,2-dinitrohexyl, and nitrohexyl.

The reaction of the substituted aminonitrile with a nitroalkanol in Reaction I can take place from about ambient temperature to about 100° C. The pressure is not critical and generally atmospheric pressure is desirable. However, higher pressures up to about 500 atmospheres may be employed. The substituted aminonitrile and the hydroxyl reactant, D—OH, react in equimolar proportions. An excess of the hydroxyl reactant—from 1 to about 5 moles of hydroxyl reactant per mole of substituted aminonitrile—may be employed. The solid product may be collected by any common liquid-solid separation means including decantation, filtration and centrifugation.

Other compounds of this invention are prepared by nitration of a substituted aminonitrile in accordance with the following reaction scheme:

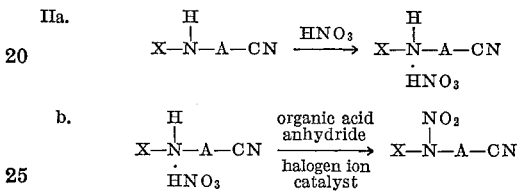

wherein X is nitroalkyl or nitrazaalkyl and A is an alkylene radical.

As defined above, A is an alkylene radical, preferably a lower alkylene radical from 1 to about 6 carbon atoms, such as methylene, ethylene, tetramethylene and hexamethylene.

X is nitroalkyl or nitraazaalkyl. Preferably, the alkyl group in each of these radicals is a lower alkyl, that is, containing up to about 6 carbon atoms. Typical radicals include 3,3-dinitrobutyl, 3,3,3-trinitropropyl, 2,3-dinitrobutyl, 3,3-dinitrohexyl, 3-nitrazabutyl 3-nitrazahexyl and 4-nitrazahexyl.

The nitration of the substituted aminonitriles—Reaction IIa—is preferably conducted at a temperature in the range of from about 0° C. to about 40° C. At lower temperatures, the reaction is difficult to control. Increased smoothness of reaction is obtained when the aminonitrile is reacted with sufficient nitric acid, from 1 to about 3 moles per mole of aminonitrile, to form the amine nitric acid salt which is separated and purified. The nitric acid salt,

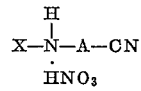

is a solid which may be separated by any of the common liquid-solid separation means such as decantation, filtration or centrifugation. The salt is then purified by washing with a suitable washing agent such as methanol, ether, methylene chloride or higher ethers. Reaction II*b* is preferably conducted in the presence of an organic acid anhydride and halogen ion catalyst, such as Cl⁻, Br⁻ in accordance with the method disclosed by Chute et al., Canadian Journal of Research B, 26:114–137. The pressure of the reaction is not critical and normally atmospheric pressure is utilized. However, higher pressures up to about 500 atmospheres may be employed if desired. Recovery of the solid product may be accomplished by any common liquid-solid separation means including decantation, filtration and centrifugation.

The separation and purification of the nitric acid salt,

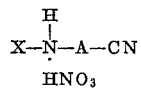

can be omitted and the desired compounds,

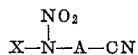

can be prepared by the sequential addition of nitric acid, organic acid anhydride and halogen ion catalyst. Better yields are obtained, however, using the two-stage preparation wherein the nitric acid salt is separated.

The starting compounds, substituted aminonitriles, which have the formula:

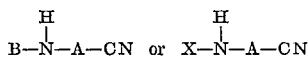

of the present invention may be prepared according to the following general reaction scheme:

III. 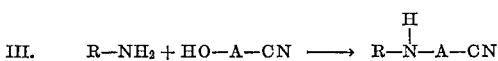

wherein R and A are as set forth above. R is a generic term which includes both B and X as defined in Reactions I and II. The above reaction can be performed from about $-10°$ C. to about $100°$ C. Preferably, the reaction takes place at $0°$ C. to about ambient temperature. The pressure under which process III is carried out is not critical. Preferably, however, the process is conducted at atmospheric pressure although higher pressures up to about 500 atmospheres can be employed if desired.

The reactants in Reaction III combine in equimolar quantities and generally it is preferred that they be added to the reaction mixture in equimolar amounts. These quantities are not critical, however, and generally from 0.5 to 2 moles of the amine per mole of the nitrile may be employed.

An alternative method of preparing the substituted aminonitrile starting compounds,

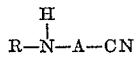

is to react the stable hydrochloride of the compound R—NH$_2$ with the nitrile compound HO—A—CN. When using this method of preparation, a solution of hydroxyl ions in water is added to neutralize the hydrochloride. Any compound which provides hydroxyl ions in solution may be used. Typical compounds include, sodium hydroxide, potassium hydroxide and calcium hydroxide. The hydroxide compound is added in equimolar proportions to the amine hydrochloride, although a slight excess may be used. In this manner the compound R—NH$_2$ is formed in situ and the reaction proceeds exactly as set forth in Reaction III. The substituted aminonitrile thus formed may be extracted with a suitable extracting agent. Typical extracting agents include, ether, methylene chloride, chloroform and higher ethers such as diisopropyl ether. The reaction may take place at temperatures and pressures similar to those discussed above for Reaction III.

Each step of the above-defined processes I, II and III is preferably conducted with agitation of the reaction mixture. Although agitation is not critical to the success or failure of the process, its use is preferred to accomplish a smooth and even reaction rate.

The time required for each step of the above-defined processes varies depending upon the reaction variables. In general, however, a time period ranging from about 15 minutes to about twenty-four hours is sufficient.

The following examples are given in illustration and are not intended to limit the scope of the above-defined invention. In the following examples, all parts and percentages are by weight unless otherwise indicated.

EXAMPLE I

In a 200 ml. 3-necked flask fitted with a mechanical stirrer and dropping funnel was placed 6.0 g. (0.0387 mole) of 3-nitraza-1-butylamine hydrochloride and 3.15 g. (0.10387 mole) of glycolonitrile. A solution of 1.55 g. (0.0387 mole) of sodium hydroxide in 5 ml. of water was added. After stirring for 15 minutes, 5 ml. of concentrated nitric acid was added. The white solid, the nitric acid salt of 3-aza-6-nitrazaheptanenitrile, was collected, washed with methanol, ether and dried. The solid weighed 5.4 g. and had a melting point of 136° C.–138° C.

A solution of 15 ml. of acetic anhydride, 2 ml. of 100% nitric acid, and 3 drops of concentrated hydrochloric acid was cooled in an ice bath. With good stirring, 5.4 g. of the above nitric acid salt was added. The white slurry was stirred for thirty minutes at 10° C.–15° C. and poured onto ice. The white solid, 3,6-dinitrazaheptannitrile, was collected by filtration, washed with water and dried. The solid weighted 4.4 g. and had a melting point of 99° C.–100° C. Recrystallization from ethylene dichloride raised the melting point to 105° C.–106° C.

*Analysis.*—Calculated for $C_5H_9N_5O_4$: C, 29.56%; H, 4.47%; N, 34.48%. Found: C, 29.29%; H, 4.34%; N, 33.43%.

EXAMPLE II

In a 300 ml. 3-necked flask fitted with a mechanical stirrer and dropping funnel was placed 19.9 g. (0.1 mole) of 3,3-dinitrobutylamine hydrochloride and 8.15 g. (0.1 mole) of glycolonitrile. A solution of 0.4 g. (0.1 mole) of sodium hydroxide in 20 ml. of water was added. The addition of the base caused an oil to separate. After stirring for fifteen minutes, the reaction mixture was extracted with ether. The ether solution was cooled to $-10°$ C. and 10 ml. of 70% nitric acid was added. The white solid, the nitric acid salt and 3-aza-6,6-dinitroheptanenitrile, was collected by filtration, washed with methanol, ether, and dried. The solid weighed 19.7 g. and had a melting point of 83° C.–85° C.

A solution of 16 ml. of acetic anhydride, 8 ml. of 100% nitric acid and 8 drops of concentrated hydrochloric acid was cooled in an ice bath. With good stirring, 19.7 g. of the above nitric acid salt was added. The white slurry was stirred for thirty minutes and poured onto ice. The white solid, 3-aza-3,6,6-trinitroheptane nitrile, was collected by filtration, washed with water and dried. The solid weighed 6 g. and had a melting point of 106° C.–107° C. Recrystallization from ethylene dichloride raised the melting point to 110° C.

*Analysis.*—Calculated for $C_6H_9N_5O_6$: C, 29.15%; H, 3.67%; N, 28.34%. Found: C, 29.54%; H, 3.66%; N, 27.43%.

EXAMPLE III

A mixture of 0.7 g. (0.01 mole) of 3-aza-butyronitrile, 10 ml. of chloroform, and 1.8 g. (0.01 mole) of trinitroethanol was refluxed for ten minutes and then evaporated to dryness in vacuum. The yellow solid, 3-aza-3-trinitroethyl-butyronitrile, was collected by filtration, washed with water and dried. The solid weighed 1.3 g. and had a melting point of 73° C.–74° C. Recrystallization from carbon tetrachloride gave light yellow needles having a melting point of 73° C.–74° C.

*Analysis.*—Calculated for: $C_5H_7N_5O_6$: C, 25.76%; H, 3.03%; N, 30.04%. Found: C, 25.50%; H, 2.90%; N, 29.83%.

EXAMPLE IV 0.05 mole of 3,3,3-trinitropropylamine hydrochloride is mixed with 0.05 mole of $\omega$-hydroxy-propionitrile. A solution of 0.05 mole of sodium hydroxide in water is added. After stirring, the reaction mixture is extracted with ether. The ether solution is cooled and nitric acid is added. The solid nitric acid salt of 4-aza-7,7,7-trinitroheptanenitrile is collected by filtration, washed with methanol and ether and dried.

A solution of acetic anhydride, 100% nitric acid, and concentrated hydrochloric acid is cooled in an ice bath. The nitric acid salt prepared above is added and the reaction mixture is stirred for thirty minutes. A good yield of solid 4-aza-4,7,7,7-tetranitroheptanenitrile is collected by filtration.

EXAMPLE V 0.01 mole of 4,4-dinitrohexylamine hydrochloride is added to 0.01 mole of ω-hydroxy-pentanonitrile. A solution of 0.012 mole of sodium hydroxide in water is added. After stirring for twenty minutes, the reaction mixture is extracted with diisopropyl ether. The ether solution is cooled and nitric acid is added. The solid nitric acid salt of 6-aza-10,10-dinitrododecanenitrile is collected by filtration, washed with methanol, ether and dried.

A solution of acetic anhydride, 100% nitric acid and hydrobromic acid is cooled in an ice bath. The nitric acid salt prepared above is added. The reaction mixture is stirred for forty-five minutes. A good yield of solid 6-aza-6,10,10-trinitro-dodecanenitrile is collected by filtration.

EXAMPLE VI 0.01 mole of 3-nitraza-1-hexylamine is added to 0.01 mole of ω-hydroxy-butyronitrile. After stirring for thirty minutes, concentrated nitric acid is added. The solid nitric acid salt of 5-aza-8-nitrazaundecanenitrile is collected, washed with methanol, ether and dried.

A solution of acetic anhydride, 100% nitric acid, and concentrated hydrochloric acid is prepared. The nitric acid salt prepared above is added. The reaction mixture is stirred for fifty minutes and a good yield of 5,8-dinitraza-undecanenitrile is collected by filtration, washed with water and dried.

EXAMPLE VII 0.03 mole of 4-nitraza-1-hexylamine is added to 0.03 mole of glycolonitrile. After stirring for twenty minutes, concentrated nitric acid is added. The solid nitric acid salt of 3-aza-7-nitrazanonanenitrile is collected, washed with methanol, ether and dried.

A solution of acetic anhydride, 100% nitric acid, and concentrated hydrochloric acid is cooled in an ice bath. The nitric acid salt prepared above was added. After stirring for twenty minutes, a good yield of solid 3,7-dinitrazanonanentrile is collected by filtration, washed with water and dried.

EXAMPLE VIII 0.05 mole of 4,4-dinitropentylamine is mixed with 0.05 mole of ω-hydroxy-propionitrile in chloroform. To the solution of 4-aza-8,8-dinitrononanenitrile thus formed is added 0.05 mole of 2,2-dinitropropanol. The reaction mixture is refluxed for twenty minutes and then evaporated to dryness. The solid 4-aza-4-[2,2-dinitropropyl] 8,8-dinitrononanenitrile is collected by filtration, washed with water and dried.

EXAMPLE IX 0.01 mole of 4-nitrazapentylamine is added to 0.0 mole of ω-hydroxy-butyronitrile in chloroform. To the solution of 5-aza-9-nitrazadecanenitrile thus formed is added 0.01 mole of 2,2-dinitrohexanol. The reaction mixture is refluxed for fifteen minutes and then evaporated to dryness. A good yield of solid 5-aza-5-[2,2-dinitrohexyl] 9-nitraza-decanenitrile is obtained by filtration, washed with water and dried.

When used as plasticizers the aminonitrile compounds of this invention exhibit high energy due to their high nitro content. Each compound of this invention contains at least two nitro groups. 3,6-dinitrazaheptanenitrile exhibits higher energy when used as a plasticizer for a common nitro polymer than a common mono-nitro plasticizer.

I claim:
1. Compounds having the formula:

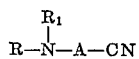

wherein A is an alkylene radical, R is alkyl, nitroalkyl radicals containing from 1 to 3 nitro groups or mononitrazaalkyl, and $R_1$ is a nitroalkyl radical containing from 1 to 3 nitro groups, said radicals A, R, and $R_1$ containing from 1 to about 6 carbon atoms, with the proviso that when R and $R_1$ are nitroalkyl, said radicals contain from 2 to about 6 carbon atoms.

2. Compounds having the formula:

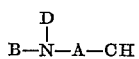

wherein A is an alkylene radical, D is a nitroalkyl radical containing from 1 to 3 nitro groups and B is alkyl, said radicals A and B containing from 1 to about 6 carbon atoms and said D radical containing from 2 to about 6 carbon atoms.

3. Compounds having the formula:

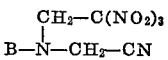

wherein B is an alkyl radical containing from 1 to about 6 carbon atoms.

4. 3-aza-3,6,6-trinitroheptanenitrile.
5. 3-aza-3-trinitroethyl-butyronitrile.
6. Compounds having the formula:

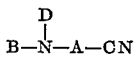

wherein A is an alkylene radical, D is a nitroalkyl radical containing from 1 to 3 nitro groups, and B is a nitroalkyl radical containing from 1 to 3 nitro groups, said radical containing from 1 to about 6 carbon atoms and said radicals D and B containing from 2 to about 6 carbon atoms.

7. Compounds having the formula:

wherein A is an alkylene radical, D is a nitroalkyl radical containing from 1 to 3 nitro groups, and B is mononitrazaalkyl, said radicals A and B containing from 1 to about 6 carbon atoms and said D radical containing from 2 to about 6 carbon atoms.

8. Compounds having the formula:

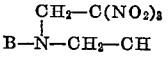

wherein B is a nitroalkyl radical containing from 2 to about 6 carbon atoms and from 1 to 3 nitro groups.

9. Compounds having the formula:

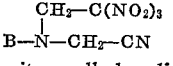

wherein B is a mononitrazaalkyl radical containing from 1 to about 6 carbon atoms.

References Cited
UNITED STATES PATENTS
2,933,518    4/1960    Frankel et al. _____ 260—465.5

JOSEPH P. BRUST, Primary Examiner

U.S. Cl. X.R.
149—96, 109